United States Patent
Ghassemi et al.

(10) Patent No.: US 12,223,088 B2
(45) Date of Patent: Feb. 11, 2025

(54) METHOD AND SYSTEM FOR DIFFERENTIALLY PRIVATE LEARNING OF HAWKES PROCESSES

(71) Applicant: JPMorgan Chase Bank, N.A., New York, NY (US)

(72) Inventors: Mohsen Ghassemi, Jersey City, NJ (US); Eleonora Kreacic, London (GB); Niccolo Dalmasso, Long Island City, NY (US); Vamsi Krishna Potluru, New York, NY (US); Tucker Richard Balch, Suwanee, GA (US); Manuela Veloso, New York, NY (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 219 days.

(21) Appl. No.: 17/963,840

(22) Filed: Oct. 11, 2022

(65) Prior Publication Data
US 2024/0135029 A1 Apr. 25, 2024

(51) Int. Cl.
G06F 21/62 (2013.01)
G06F 17/18 (2006.01)

(52) U.S. Cl.
CPC .......... *G06F 21/6245* (2013.01); *G06F 17/18* (2013.01)

(58) Field of Classification Search
CPC ............................ G06F 21/6245; G06F 17/18
See application file for complete search history.

(56) References Cited

U.S. PATENT DOCUMENTS

| | | | | |
|---|---|---|---|---|
| 2016/0371598 A1* | 12/2016 | Ding | ...................... | G06F 16/00 |
| 2017/0270442 A1* | 9/2017 | Zhang | .................... | G06Q 50/06 |
| 2022/0391736 A1* | 12/2022 | Ide | ........................... | G06N 7/01 |
| 2024/0104584 A1* | 3/2024 | Snyder, Jr. | ......... | G06Q 30/0201 |

OTHER PUBLICATIONS

Xiao et al, Learning Time Series Associated Event Sequences With Recurrent Point Process Networks, Oct. 2019, IEEE, vol. 30, No. 10, pp. 3124-3136 (Year: 2019).*
Dassios et al, Exact simulation of Hawkes process with exponentially decaying intensity, Jul. 2013, Project euclid, pp. 1-13 (Year: 2013).*

* cited by examiner

*Primary Examiner* — Raqiul A Choudhury
(74) *Attorney, Agent, or Firm* — GREENBLUM & BERNSTEIN, P.L.C.

(57) ABSTRACT

A method for preserving privacy with respect to modeling event sequence data is provided. The method includes: receiving information about a sequence of events; modeling the event sequence by a Hawkes process that has an intensity that includes an exogenous base intensity rate and an indigenous component that has an excitation rate and a decay rate; analyzing the received information; and determining estimated values of the exogenous base intensity rate and the excitation rate, such that an accuracy of the estimates corresponds to a length of time over which the sequence of events is observed. Differential privacy is introduced by adding noise to the sequence of events in order to preserve the privacy of individuals associated with the events, and a cost of the differential privacy is expressible as an additional length of observation time required to ensure the accuracy of the estimates.

18 Claims, 4 Drawing Sheets

METHOD AND SYSTEM FOR DIFFERENTIALLY PRIVATE LEARNING OF HAWKES PROCESSES

BACKGROUND

1. Field of the Disclosure

This technology generally relates to methods and systems for providing privacy in modeling time-sequential data, and more particularly to methods and systems for differentially private learning of Hawkes processes in order to preserve privacy of individuals whose activity is linked to the time-sequential data.

2. Background Information

Event sequence data capture the unfolding of a discrete set of events over time. Events data are ubiquitous in many domains, with frequencies spanning many time scales. In finance, limit order book data record the orders place on specific securities every tenth of a second. In advertising, daily clickstream data detail the search habits of consumers or the popularity and interactions within a social media network. In geology, earthquake logs report the strength of surface movements over several decades. Unlike time series however, events data are asynchronous. In other words, the time between events is not regular and is in fact a fundamental piece in understanding the dynamics of the event data. Temporal point processes are a powerful mathematical tool to model inter-arrival times between events. One can use point processes not only to learn event dynamics but also to simulate event sequences with the same inter-arrival dynamic. Hawkes processes are a class of point processes that capture self-excitation dynamics, i.e., situations in which the arrival of one event increases the rate of the next event. Hawkes processes have recently gained increasing attention from the machine learning community due to their versatility in modeling event sequence data. Successful applications have included topic modeling and clustering for text document streams, network structure reconstruction and inference, personalized recommendations, and learning causality structures.

In certain applications, however, the use of Hawkes processes for both inference and simulation with event sequence data can raise privacy concerns. In epidemiology, infection events data are used to model the infection dynamics and eventually inform mitigation measures, but the personal information of specific infected individuals should remain anonymous. In finance, modeling trading activity on financial securities is key for market makers, but one must be careful not to leak information about a specific client activity. Differential privacy (DP) provides theoretical guarantees that, from information that is available, a potential adversary is not able to distinguish whether or not a particular individual was present in a dataset. The standard DP setting assumes independence of the records in a database. However, event sequences generated by Hawkes processes come with the caveat that a single individual is identifiable not only through their own activity, but all the activities they have influenced or by which they have been influenced. Thus, a potential adversary would need to be prevented from identifying all activities linked to a single individual.

Overall, while Hawkes processes have a rich history going back decades, some of their properties, such as sample complexity for learning the parameters and releasing differentially private versions, are yet to be thoroughly analyzed.

Accordingly, there is a need for a mechanism for providing differentially private learning of Hawkes processes in order to preserve privacy of individuals whose activity is linked to the time-sequential data.

SUMMARY

The present disclosure, through one or more of its various aspects, embodiments, and/or specific features or sub-components, provides, inter alia, various systems, servers, devices, methods, media, programs, and platforms for methods and systems for differentially private learning of Hawkes processes in order to preserve privacy of individuals whose activity is linked to the time-sequential data.

According to an aspect of the present disclosure, a method for preserving privacy with respect to modeling a sequence of events is provided. The method is implemented by at least one processor. The method includes: receiving, by the at least one processor, first information that relates to a sequence of events; modeling, by the at least one processor based on the received first information, the sequence of events by a Hawkes process that has an intensity that is characterized by an exogenous base intensity rate and an indigenous component that relates to an impact of previous events, the indigenous component being characterized by an excitation rate and a decay rate; analyzing, by the at least one processor, the received first information; and determining, by the at least one processor based on a result of the analyzing, an estimated value of the exogenous base intensity rate and an estimated value of the excitation rate.

The sequence of events may include an asynchronous sequence of events for which respective intervals of time between corresponding pairs of consecutive events are irregular.

The determining may include calculating, for a predetermined distance between true values of the exogenous base intensity rate and the excitation rate and the estimated values of the exogenous base intensity rate and the excitation rate, a first minimum amount of time over which the sequence of events is observable.

The first information that relates to the sequence of events may include, for each respective event included in the sequence of events, second information that indicates a respective time of occurrence of the respective event and third information that indicates an identity of an individual person associated with the respective event.

The analyzing may include: deriving a discrete time count data time series associated with the sequence of events by generating a count measure on consecutive time intervals having a predetermined length; estimating a sample mean value that corresponds to the discrete count data time series; and estimating a sample variance value that corresponds to the discrete count data time series. The determining of the estimated value of the exogenous base intensity rate and the estimated value of the excitation rate may be based on the estimated sample mean value and the estimated sample variance value.

The modeling may include introducing differential privacy to the estimates of the Hawkes process parameters, i.e., the estimated sample mean value and the estimated sample variance value. The differential privacy may correspond to a probability that an observation of an output of the modeling is usable for inferring the third information that indicates an identity of an individual person for at least one event included in the sequence of events.

The introducing of the differential privacy may include using a Laplace mechanism that is defined by a difference between the sample mean value and the sample variance value obtained from a first data set that corresponds to the sequence of events and the sample mean value and the sample variance value obtained from a second data set that corresponds to an adjacent sequence of events.

The method may further include calculating a cost associated with the introducing of differential privacy to the learning of the Hawkes process parameters. The cost may be expressible as a required additional amount of time over which the sequence of events is observable for the predetermined distance between true values of the exogenous base intensity rate and the excitation rate and the estimated values of the exogenous base intensity rate and the excitation rate.

The calculating of the cost may include: assigning a lower bound and an upper bound to the value of the exogenous base intensity rate and assigning a lower bound and an upper bound to the value of the excitation rate; and calculating a sensitivity of the sample mean value and the sample variance value based on the assigned upper bounds and lower bounds.

According to another exemplary embodiment, a computing apparatus for preserving privacy with respect to modeling a sequence of events is provided. The computing apparatus includes a processor; a memory; and a communication interface coupled to each of the processor and the memory. The processor is configured to: receive, via the communication interface, first information that relates to a sequence of events; model, based on the received first information, the sequence of events by a Hawkes process that has an intensity that is characterized by an exogenous base intensity rate and an indigenous component that relates to an impact of previous events, the indigenous component being characterized by an excitation rate and a decay rate; analyze the received first information; and determine, based on a result of the analysis, an estimated value of the exogenous base intensity rate and an estimated value of the excitation rate.

The sequence of events may include an asynchronous sequence of events for which respective intervals of time between corresponding pairs of consecutive events are irregular.

The processor may be further configured to calculate, for a predetermined distance between true values of the exogenous base intensity rate and the excitation rate and the estimated values of the exogenous base intensity rate and the excitation rate, a first minimum amount of time over which the sequence of events is observable.

The first information that relates to the sequence of events may include, for each respective event included in the sequence of events, second information that indicates a respective time of occurrence of the respective event and third information that indicates an identity of an individual person associated with the respective event.

The processor may be further configured to: derive a discrete time count data time series associated with the sequence of events by generating a count measure on consecutive time intervals having a predetermined length; estimate a sample mean value that corresponds to the discrete count data time series; estimate a sample variance value that corresponds to the discrete count data time series; and determine the estimated value of the exogenous base intensity rate and the estimated value of the excitation rate based on the estimated sample mean value and the estimated sample variance value.

The processor may be further configured to introduce differential privacy to the sequence of events by adding noise to the estimated sample mean value and the estimated sample variance value. The differential privacy may correspond to a probability that an observation of an output of the modeling is usable for inferring the third information that indicates an identity of an individual person for at least one event included in the sequence of events.

The processor may be further configured to introduce the differential privacy to the sequence of events by using a Laplace mechanism that is defined by a difference between the sample mean value and the sample variance value obtained from a first data set that corresponds to the sequence of events and the sample mean value and the sample variance value obtained from a second data set that corresponds to an adjacent sequence of events.

The processor may be further configured to calculate a cost associated with the introduction of the differential privacy. The cost may be expressible as a required additional amount of time over which the sequence of events is observable for the predetermined distance between true values of the exogenous base intensity rate and the excitation rate and the estimated values of the exogenous base intensity rate and the excitation rate.

The processor may be further configured to: assign a lower bound and an upper bound to the value of the exogenous base intensity rate and assign a lower bound and an upper bound to the value of the excitation rate; and calculate a sensitivity of the sample mean value and the sample variance value based on the assigned upper bounds and lower bounds.

According to yet another exemplary embodiment, a non-transitory computer readable storage medium storing instructions for preserving privacy with respect to modeling a sequence of events is provided. The storage medium includes executable code which, when executed by a processor, causes the processor to: receive first information that relates to a sequence of events; model, based on the received first information, the sequence of events by a Hawkes process that has an intensity that is characterized by an exogenous base intensity rate and an indigenous component that relates to an impact of previous events, the indigenous component being characterized by an excitation rate and a decay rate; analyze the received first information; and determine, based on a result of the analysis, an estimated value of the exogenous base intensity rate and an estimated value of the excitation rate.

The sequence of events may include an asynchronous sequence of events for which respective intervals of time between corresponding pairs of consecutive events are irregular.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
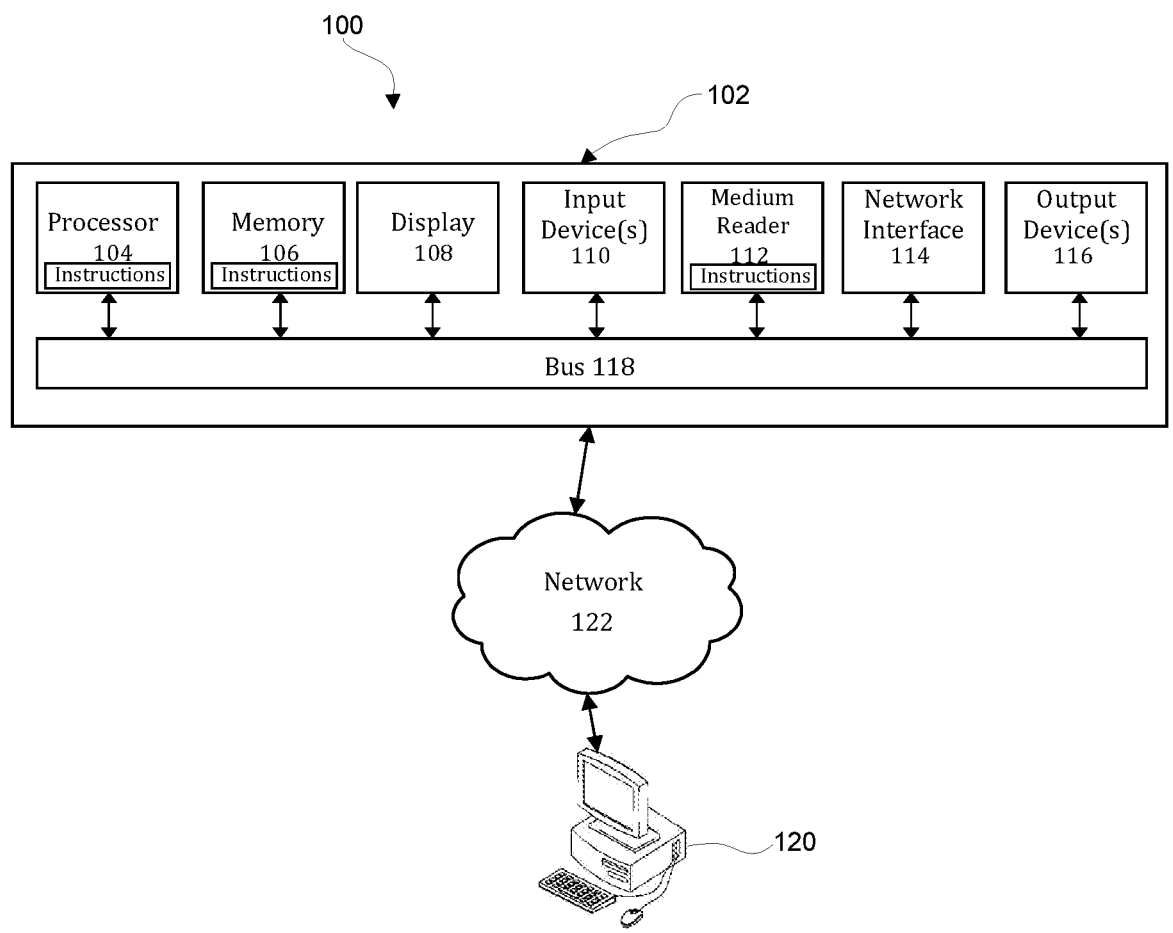
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component.

The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data as well as executable instructions and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g. software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote-control output, a printer, or any combination thereof.

Each of the components of the computer system 102 may be interconnected and communicate via a bus 118 or other communication link. As illustrated in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is illustrated in FIG. 1 as a wireless network, those skilled in the art appreciate that the network 122 may also be a wired network.

The additional computer device 120 is illustrated in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide optimized methods and systems for differentially private learning of Hawkes processes in order to preserve privacy of individuals whose activity is linked to the time-sequential data.

Figure 2:
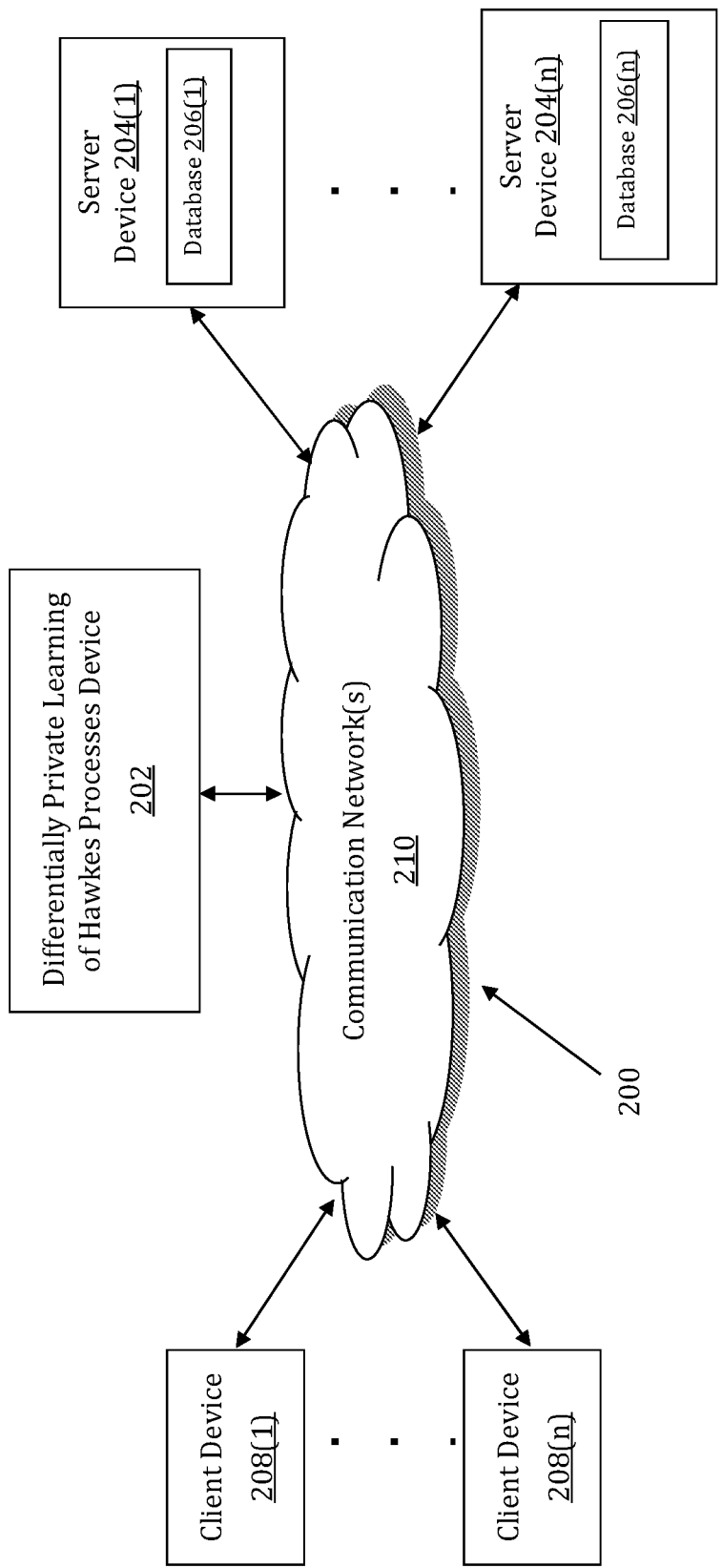
FIG. 2 illustrates an exemplary diagram of a network environment.

Referring to FIG. 2, a schematic of an exemplary network environment 200 for implementing a method for differentially private learning of Hawkes processes in order to preserve privacy of individuals whose activity is linked to the time-sequential data is illustrated. In an exemplary embodiment, the method is executable on any networked computer platform, such as, for example, a personal computer (PC).

The method for differentially private learning of Hawkes processes in order to preserve privacy of individuals whose activity is linked to the time-sequential data may be implemented by a Differentially Private Learning of Hawkes Processes (DPLHP) device 202. The DPLHP device 202 may be the same or similar to the computer system 102 as described with respect to FIG. 1. The DPLHP device 202 may store one or more applications that can include executable instructions that, when executed by the DPLHP device 202, cause the DPLHP device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the DPLHP device 202 itself, may be located in virtual server(s) running in a cloud-based computing environment rather than being tied to one or more specific physical network computing devices. Also, the application(s) may be running in one or more virtual machines (VMs) executing on the DPLHP device 202. Additionally, in one or more embodiments of this technology, virtual machine(s) running on the DPLHP device 202 may be managed or supervised by a hypervisor.

In the network environment 200 of FIG. 2, the DPLHP device 202 is coupled to a plurality of server devices 204(1)-204(n) that hosts a plurality of databases 206(1)-206(n), and also to a plurality of client devices 208(1)-208(n) via communication network(s) 210. A communication interface of the DPLHP device 202, such as the network interface 114 of the computer system 102 of FIG. 1, operatively couples and communicates between the DPLHP device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the DPLHP device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and DPLHP devices that efficiently implement a method for differentially private learning of Hawkes processes in order to preserve privacy of individuals whose activity is linked to the time-sequential data.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The DPLHP device 202 may be a standalone device or integrated with one or more other devices or apparatuses, such as one or more of the server devices 204(1)-204(n), for example. In one particular example, the DPLHP device 202 may include or be hosted by one of the server devices 204(1)-204(n), and other arrangements are also possible. Moreover, one or more of the devices of the DPLHP device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the DPLHP device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store data that relates to historical Hawkes process time-sequential events and data that relates to intensity and excitation function parameters of Hawkes processes.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can interact with the DPLHP device 202 via communication network(s) 210. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(n) may run interface applications, such as standard web browsers or standalone client applications, which may provide an interface to communicate with the DPLHP device 202 via the communication network(s) 210 in order to communicate user requests and information. The client devices 208(1)-208(n) may further include, among other features, a display device, such as a display screen or touchscreen, and/or an input device, such as a keyboard, for example.

Although the exemplary network environment 200 with the DPLHP device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the DPLHP device 202, the server devices 204(1)-204(n), or the client devices 208(1)-208(n), for example, may be configured to operate as virtual instances on the same physical machine. In other words, one or more of the DPLHP device 202, the server devices 204(1)-204(n), or the client devices 208(1)-208(n) may operate on the same physical device rather than as separate devices communicating through communication network(s) 210. Additionally, there may be more or fewer DPLHP devices 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
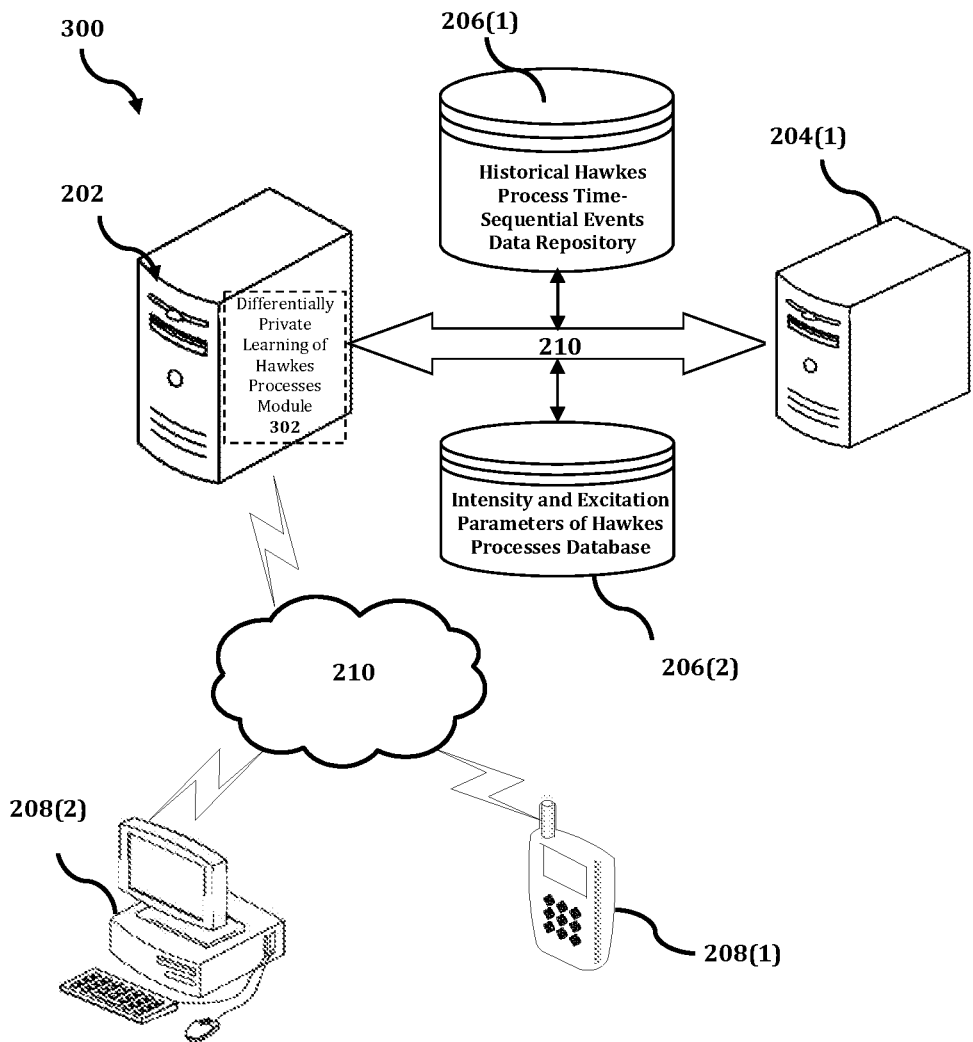
FIG. 3 shows an exemplary system for implementing a method for differentially private learning of Hawkes processes in order to preserve privacy of individuals whose activity is linked to the time-sequential data.

The DPLHP device 202 is described and illustrated in FIG. 3 as including a differentially private learning of Hawkes processes module 302, although it may include other rules, policies, modules, databases, or applications, for example. As will be described below, the differentially private learning of Hawkes processes module 302 is configured to implement a method for differentially private learning of Hawkes processes in order to preserve privacy of individuals whose activity is linked to the time-sequential data.

An exemplary process 300 for implementing a mechanism for differentially private learning of Hawkes processes in order to preserve privacy of individuals whose activity is linked to the time-sequential data by utilizing the network environment of FIG. 2 is illustrated as being executed in FIG. 3. Specifically, a first client device 208(1) and a second client device 208(2) are illustrated as being in communication with DPLHP device 202. In this regard, the first client device 208(1) and the second client device 208(2) may be "clients" of the DPLHP device 202 and are described herein as such. Nevertheless, it is to be known and understood that the first client device 208(1) and/or the second client device 208(2) need not necessarily be "clients" of the DPLHP device 202, or any entity described in association therewith herein. Any additional or alternative relationship may exist between either or both of the first client device 208(1) and the second client device 208(2) and the DPLHP device 202, or no relationship may exist.

Further, DPLHP device 202 is illustrated as being able to access a historical Hawkes process time-sequential events data repository 206(1) and an intensity and excitation parameters of Hawkes processes database 206(2). The differentially private learning of Hawkes processes module 302 may be configured to access these databases for implementing a method for differentially private learning of Hawkes processes in order to preserve privacy of individuals whose activity is linked to the time-sequential data.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the DPLHP device 202 via broadband or cellular communication. Of course, these embodiments are merely exemplary and are not limiting or exhaustive.

Upon being started, the differentially private learning of Hawkes processes module 302 executes a process for differentially private learning of Hawkes processes in order to preserve privacy of individuals whose activity is linked to the time-sequential data. An exemplary process for differentially private learning of Hawkes processes in order to preserve privacy of individuals whose activity is linked to the time-sequential data is generally indicated at flowchart 400 in FIG. 4.

Figure 4:
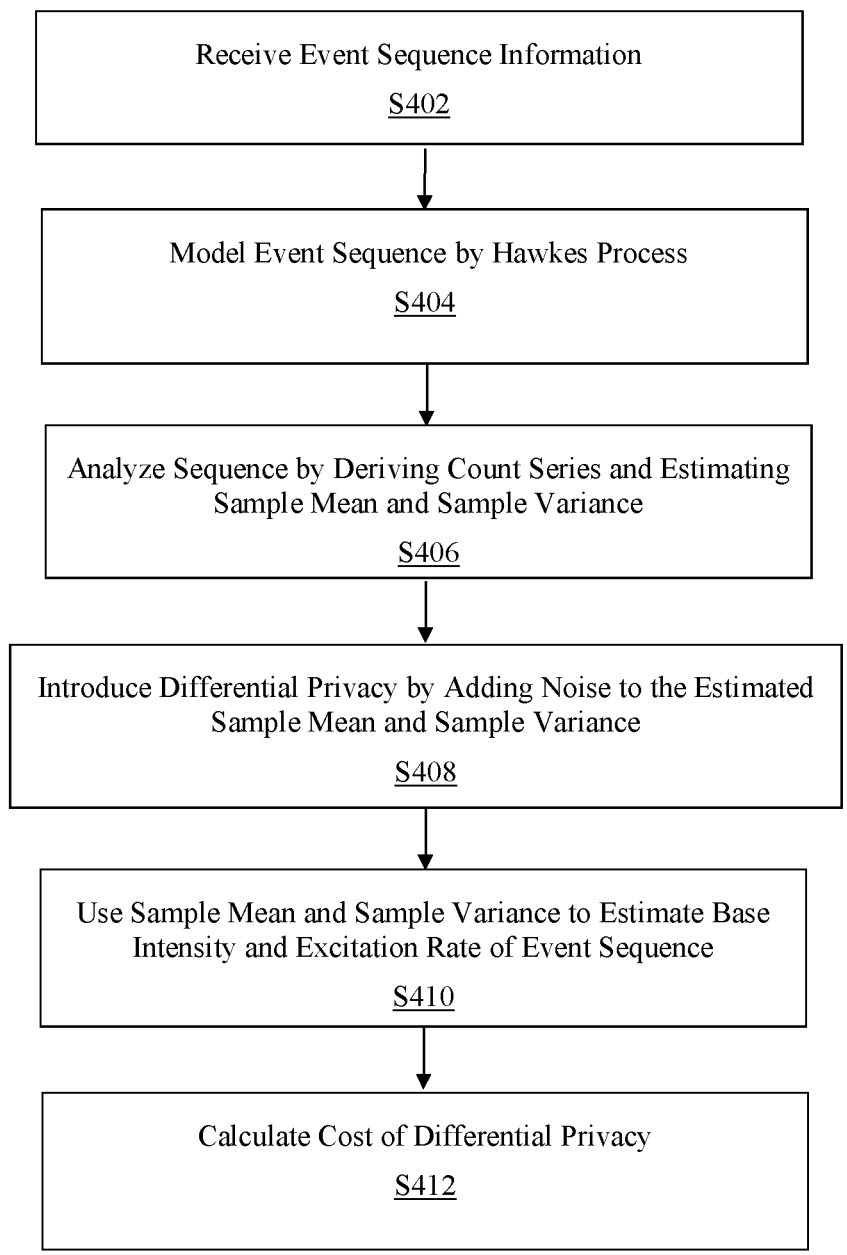
FIG. 4 is a flowchart of an exemplary process for implementing a method for differentially private learning of Hawkes processes in order to preserve privacy of individuals whose activity is linked to the time-sequential data.

In process 400 of FIG. 4, at step S402, the differentially private learning of Hawkes processes module 302 receives a first set of information that relates to a sequence of events. In an exemplary embodiment, the sequence of events is an asynchronous sequence, in that the time between consecutive events is not regular, and may be random. In an exemplary embodiment, the first set of information includes second information that indicates a time of occurrence for each respective event and third information that indicates an identity of at least one individual person associated with the respective event.

At step S404, the differentially private learning of Hawkes processes module 302 models the sequence of events by a Hawkes process. In an exemplary embodiment, a Hawkes process is definable in terms of an intensity that is expressible as a sum of an exogenous base intensity rate and an indigenous component that relates to an impact of previous events, where the indigenous component is characterized by an excitation rate and a decay rate.

At step S406, the differentially private learning of Hawkes processes module 302 analyzes the first set of information. In an exemplary embodiment, the analysis of the first set of information includes the following operations: deriving a discrete time count data time series (hereinafter referred to as a count series) associated with the event sequence by generating a count measure on consecutive time intervals having a predetermined length; estimating a sample mean value that corresponds to the count series; and estimating a sample variance value that corresponds to the count series. For example, if the event sequence includes 20 events that occur asynchronously over a total time of three hours, and an interval value of 30 minutes is used, then the count series will include six values that correspond to the numbers of events that occur during each 30-minute interval. Further to the example, if nine (9) of the events occur in the first 30 minutes, two (2) of the events occur in the second 30 minutes, three (3) of the events occur in the next 30 minutes, zero (0) of the events occur in the next 60 minutes, and the last six (6) events occur in the final 30 minutes of the three-hour period, then the count series would be (9, 2, 3, 0, 0, 6).

At step S406, the differentially private learning of Hawkes processes module 302 introduces differential privacy to the sequence of events by adding noise to the estimated sample mean value and the estimated sample variance value. In an exemplary embodiment, the differential privacy corresponds to a probability that an observation of the model of the event sequence is usable for inferring the identity of any individual person that is associated with any of the events included in the sequence. In an exemplary embodiment, the introduction of the differential privacy may be performed by using a Laplace mechanism that is defined by a difference between the estimated sample mean value and the estimated sample variance value obtained from a first data set that corresponds to the event sequence and the estimated sample mean value and the estimated sample variance value obtained from a second data set that corresponds to an adjacent event sequence (also referred to herein as a neighboring event sequence).

At step S410, the differentially private learning of Hawkes processes module 302 determines an estimated value of the exogenous base intensity rate and an estimated value of the excitation rate for the event sequence, as defined by the Hawkes process model thereof generated in step S404. In an exemplary embodiment, the determination of the estimated values of the exogenous base intensity rate and the excitation rate is based on the sample mean value and the sample variance value estimated in step S408. In an exemplary embodiment, in recognition of the fact that the values being determined are estimates, a maximum distance between the true values of the exogenous base intensity rate and the excitation rate and the estimated values thereof may be specified, in order to ensure a degree of accuracy of the estimated values. In this aspect, the determination of these estimated values also includes a determination of a minimum amount of time over which the sequence of events is observable in order to comply with the specified maximum distance between the estimates and the corresponding true values.

At step S412, the differentially private learning of Hawkes processes module 302 calculates a cost of the differential privacy introduced in step S406. In an exemplary embodiment, the cost is expressible as an additional amount of time during which the event sequence requires observation in order to comply with the specified maximum distance between the estimates and the corresponding true values of the exogenous base intensity rate and the excitation rate, as compared with the minimum observation time that would otherwise be required without the introduction of the differential privacy. In an exemplary embodiment, the calculation of the cost includes the following operations: assigning a lower bound and an upper bound to the value of the exogenous base intensity rate; assigning a lower bound and an upper bound to the value of the excitation rate; and calculating a sensitivity of the sample mean value and the sample variance value based on the assigned upper bounds and lower bounds.

In an exemplary embodiment, a system and a method for differentially private learning of Hawkes processes in order to preserve privacy of individuals whose activity is linked to the time-sequential data is implemented by obtaining a first sample complexity result for estimates of Hawkes processes. Sample complexity is expressible in terms of an upper bound on the minimum period of time a Hawkes process needs to be observed for the estimator to reach within a desired distance of true parameters. Then, ($\gamma$, $\epsilon$)-random differentially private versions of the estimates are provided, and sample complexity results are obtained in this context. Finally, based on the obtained sample complexity results, a theoretical result on a cost of privacy is obtained, as measured by additional time required for private estimates to reach within the desired distance of true estimates, in comparison to their non-private counterparts.

In an exemplary embodiment, in a random differentially private setting, data samples are seen as random draws from an unknown distribution, and differential privacy is guaranteed with high probability with respect to the realizations of the underlying data generating distribution. Note that random differential privacy is different from approximate differential privacy, also known as ($\gamma$, $\epsilon$)-differential privacy, and is also different from probabilistic differential privacy, in which the high probability argument is with respect to the randomness in the outcome of the randomized mechanism, and not over the realizations of the unknown data generating distribution.

A distinction is also drawn between independent and identically distributed (i.e., i.i.d.) data and non-i.i.d. data. In a non-i.i.d. setting, the presence of each data point may reveal information about the presence of data points correlated to it in the dataset. Hence, removing one entry from the dataset may impact other entries as well. When analyzing privacy guarantees in this scenario, it is thus not sufficient to simply remove one entry from the dataset, but also any trace of the presence of such entry needs to be removed. Differential privacy in non-i.i.d. settings has been analyzed for time series data and tabular data. In comparison, in an exemplary embodiment, privacy is analyzed for modeling sequential events data, another setting where the occurrence of the events are often correlated with one another.

In an exemplary embodiment, the obtaining of sample complexity information and the privacy analysis relies on statistical properties of Hawkes processes. In this analysis, reliance is placed on the stationarity of Hawkes processes and a strong mixing property of the count series associated with a Hawkes process, which allow for the use of analytical tools used for weakly dependent data. The analysis further relies on the moments of Hawkes processes. In addition, in order to analyze the sensitivity of the differentially private estimator, the immigration-birth representation of Hawkes processes is utilized for viewing Hawkes processes as branching processes, thereby facilitating a finding of probabilistic upper bounds on the number of records (i.e., events) that are correlated. In this aspect, the focus is on obtaining error bounds and sample complexity results for estimation of Hawkes process parameters. The theoretical estimation bounds in the non-private setting are most closely related to regret bounds for an online maximum likelihood estimator of Hawkes processes. In an exemplary embodiment, bounds are directly provided for the estimation error of the Hawkes parameters.

Hawkes Processes: In an exemplary embodiment, an intensity of a Hawkes process may be expressed by Equation 1 below:

$$\lambda_t^* = \mu + \int_{-\infty}^{t} \alpha e^{-\beta(t-s)} dN(s) = \mu + \sum_{t_i < t} \alpha e^{-\beta(t_i - t)}, \quad (1)$$

wherein $\mu$ corresponds to the exogenous base rate of the Hawkes process, i.e., the rate of the background Poisson process, and $\Sigma_{t_i<t} \alpha e^{-\beta(t_i-t)}$ captures the indigenous component, i.e., the impact of previous events. The exponential impact function $\alpha e^{-\beta(t_i-t)}$ is parameterized by the excitation rate $\alpha$ and the decay rate $\beta$. In an exemplary embodiment, for simplicity, it is assumed that $\alpha<\beta$ and $\beta=1$. For the Hawkes process H(t) defined by Equation 1 above, associated count process N(t)=(N(t): t≥0) is given by N(t)=H(t)−H(0).

Differential Privacy: Differential privacy is a quantitative definition of privacy that measures the privacy leakage from publishing functions of private data.

Definition 1: A randomized mechanism $\mathfrak{M}: X^n \rightarrow y$ is ($\epsilon$, $\delta$)-differentially private if for any two datasets $\mathcal{D}$, $\mathcal{D}' \in X^n$ that differ in only one the entry, the following expression is true:

$$\forall \mathcal{C} \subseteq \mathcal{Y}, \mathbb{P}(\mathfrak{M}(\mathcal{D}) \in \mathcal{C}) \leq e^\epsilon \mathbb{P}(\mathfrak{M}(\mathcal{D}') \in \mathcal{C}) + \delta.$$

When $\delta=0$, it may be said that $\mathfrak{M}$ satisfies $\epsilon$-differential privacy.

In an exemplary embodiment, a differentially private mechanism relies on the idea of adding deliberate noise to a non-private mechanism. One such mechanism is the Laplace mechanism, which is defined as $$M_{Lap}(\mathcal{D}, f(\cdot), \epsilon) = f(\mathcal{D}) + \Lambda(0, \Delta_f/\epsilon), \text{ where } \Delta_f = \max_{\mathcal{D}, \mathcal{D}'} \|f(\mathcal{D}) - f(\mathcal{D}')\|_1,$$

where $\Delta_f$ is the $\ell_1$ sensitivity of f with respect to change of a single query in the dataset, and $\Lambda$ denotes a Laplace random variable parameterized by the mean and scale.

Definition 2: A randomized mechanism $\mathfrak{M}: X^n \to y$ is $(\gamma, \varepsilon)$-randomly differentially private if Equation 2 below is true:

$$\mathbb{P}_{(\forall \mathcal{C} \subset \mathcal{Y}, \mathbb{P}(\mathfrak{M}(\mathcal{D}) \in \mathcal{C}) \leq e^{\varepsilon} \mathbb{P}(\mathfrak{M}(\mathcal{D}') \in \mathcal{C}))} \geq 1-\gamma \quad (2)$$

where the inner probability is over the randomness of the mechanism, and the outer probability is over neighboring datasets $\mathcal{D}, \mathcal{D}' \in X^n$ drawn from distribution P on the space $X^n$.

Estimating parameters of a Hawkes process: In order to estimate parameters $\mu$ and $\alpha$ of a Hawkes process H(t) defined by Equation 1 above, the discrete time count data series (hereinafter referred to as "count series") associated with H(t) is examined, as generated by the count measure on consecutive intervals of size $\Delta$. The count series of H(t) is denoted with interval size $\Delta$ by $\{Y_i(\Delta) = N(i\Delta) - N((i-1)\Delta)\}_{i=1}^{K}$ where N(t) is the count process associated with H(t), $K = T/\Delta$, and T represents the length of the observation period.

It is assumed that $$\lambda_\infty := \lim_{t \to \infty} \mathbb{E}[\lambda_t^*] = \frac{\mu}{1-\alpha}.$$

Further assuming that the Hawkes process under consideration has started at $-\infty$, then at any time during the observation period $t \in [0, T]$, it is true that $\mathbb{E}[\lambda_t^*] = \lambda_\infty$. Under this stationarity assumption, for the count series $Y_1(\Delta)$, $Y_2(\Delta), \ldots, Y_K(\Delta)$, Equations 3 and 4 below are true:

$$\eta := \mathbb{E}[Y_i(\Delta)] = \frac{\mu\Delta}{(1-\alpha)} \quad (3)$$

$$\sigma^2 := \text{Var}[Y_i(\Delta)] = \frac{\mu\Delta}{(1-\alpha)^3} + \frac{\alpha^2\mu(1-e^{-2(1-\alpha)\Delta})}{2(1-\alpha)^4} - \frac{2\alpha\mu(1-e^{-(1-\alpha)\Delta})}{(1-\alpha)^4} \quad (4)$$

for all $i \in 1, 2, \cdots, K$.

From Equations 3 and 4, one can compute based on the values of $\mu$ and $\alpha$ based on the values of $\eta$ and $\sigma^2$. Therefore, by deriving a sample mean $\eta'$ and a sample variance $\sigma^{2'}$ of $Y_i$, one may obtain estimates for $\mu'$ and $\alpha'$. Note that the random variables $Y_i(\Delta)$ are not independent. However, the strong mixing property of stationary Hawkes processes and their associated count series allows for reliance on standard results of statistical properties of weakly dependent random variables, which thus facilitates obtaining of sample complexity results.

Sample complexity of the estimator: In an exemplary embodiment, an upper bound is obtained on the minimum period of time the Hawkes process needs to be observed (i.e., the minimum length of sequence) required for the estimator to reach within a desired distance of the true parameters of the Hawkes process. This requirement is referred to hereinafter as the sample complexity.

It is assumed that $\eta_4(\Delta) = \mathbb{E}[(N_\Delta)^4]$ denotes the fourth moment of $N_\Delta$ in the stationary regime, and that $\Phi$ denotes the cumulative distribution function (CDF) of a standard normal distribution. For a fixed bins size $\Delta$, the sample complexity result determines a minimum observation period $T = K\Delta$ that is need in order to achieve desired precision with desired probability.

Theorem 1: Let $\hat{\mu}$ and $\hat{\alpha}$ be the estimates of parameters $\mu_{lower} \leq \mu \leq \mu_{upper}$ and $\alpha^{lower} \leq \alpha \leq \alpha^{upper}$ of Hawkes process started from stationarity. Let $\Psi(\cdot)$ denote the inverse CDF of the standard normal distribution. Let $T = K\Delta$ denote the length of time the Hawkes process is observed, divided into K intervals of size $\Delta$ such that $$\Delta > \frac{4C_9 \mu^{upper}}{(1-\alpha^{upper})^4 \xi}$$

for some $$C_9 = \max\left\{\frac{8}{\mu_{lower}(1-\alpha_{upper})}, 1 + \frac{8\mu_{upper}}{\mu_{lower}(1-\alpha_{upper})^2} + \frac{4}{3(1-\alpha_{upper})}\right\}.$$

where $$0 < \xi < \frac{C_9 \mu_{lower}}{6}$$

Then, if $$T \geq \frac{\sigma^2}{\xi} m \quad (5)$$

$$\left\{\frac{C_9^2 \Psi\left(1-\frac{\delta}{8}\right)^2}{\xi\Delta}, \frac{9C_9^2 \Psi\left(1-\frac{\delta}{16}\right)^2 (\eta_4 - \sigma^2)}{\xi\Delta}, 3C_9 \Psi\left(1-\frac{\delta}{16}\right)^2, \frac{24C_9}{\delta}\right\},$$

for some $0 < \delta \leq 1$, we have $\mathbb{P}(|\alpha - \hat{\alpha}| > \xi) \leq \delta$ and $\mathbb{P}(|\mu - \hat{\mu}| > \xi) \leq \delta$.

Proof sketch: In order to prove $\mathbb{P}(|\alpha - \hat{\alpha}| > \xi) \leq \delta$ and $\mathbb{P}(|\mu - \hat{\mu}| > \xi) \leq \delta$, we show that it suffices to have $$\mathbb{P}\left(|\hat{\eta} - \eta| > \frac{\xi\Delta}{C_9}\right) < \delta/2$$

and $$\mathbb{P}\left(|\hat{\sigma}^2 - \sigma^2| > \frac{\xi\Delta}{C_9}\right) < \delta/2.$$

The strong mixing property of Hawkes processes allows us to employ Berry-Essen theorem for weakly dependent random variables [53] to show that the condition $$\mathbb{P}\left(|\hat{\eta} - \eta| > \frac{\xi\Delta}{C_9}\right) < \delta/2$$

on the sample mean is satisfied by the first term in condition (5). We now turn to sample variance. We have $$\hat{\sigma}^2 - \sigma^2 = \frac{1}{K}\sum_{i=1}^{K}\left[(Y_i - \eta)^2 - \sigma^2\right] - \left(\frac{1}{K}\sum_{i=1}^{K} Y_i - \eta\right)^2 + \frac{\hat{\sigma}^2}{K}.$$

Therefore, to guarantee $$\mathbb{P}\left(|\hat{\sigma}^2 - \sigma^2| > \frac{\xi\Delta}{C_9}\right) < \delta/2,$$

it is sufficient to show $$\mathbb{P}\left(\left|\frac{1}{K}\sum_{i=1}^{K}(Y_i - \eta)^2 - \sigma^2\right| > \frac{\xi\Delta}{3C_9}\right) < \frac{3\delta}{16}, \quad (6)$$

$$\mathbb{P}\left(\left|\frac{1}{K}\sum_{i=1}^{K} Y_i - \eta\right|^2 > \frac{\xi\Delta}{3C_9}\right) < \frac{3\delta}{16}, \quad (7)$$

$$\mathbb{P}\left(\frac{\hat{\sigma}^2}{K} > \frac{\xi\Delta}{3C_9}\right) < \frac{\delta}{8}. \quad (8)$$

By employing the Berry-Essen theorem for weakly dependent random variables together with Markov's inequality, it may be shown that Equations 6, 7, and 8 are respectively satisfied by the second, third, and fourth terms in Equation 5.

Differential Privacy Modeling of Sequential Events Data: Consider a sequence of events $S(t)=\{e_i=(x_i, t_i)|t_i<t\}$. It is assumed that the occurrence of the events is governed by a Hawkes process defined in Equation 1 above. In an exemplary embodiment, a study is performed regarding the setting where $t_i$ denotes the timestamp of the i-th even and $x_i$ contains the identity of the individual associated with that event. The objective is to learn the true parameters of the underlying Hawkes process while preserving the privacy of the individuals whose data (i.e., events) are present in the stream. In this aspect, it is desired to make it impossible for an adversary to infer with certainty whether or not $e_i=(x_i, t_i)$ is present in the sequence used to learn the learning algorithm $\mathfrak{M}$ by observing the output of $\mathfrak{M}$, i.e., the estimates of the Hawkes parameters.

The formulation of the Hawkes process as expressed in Equation 1 implies that the occurrence of any event j may be a result of an immigration, due to the background Poisson process, or birth of a child of any of the previous events (i.e., indigenous excitation), with probabilities depending on $\mu$, $\alpha$, $\beta$, and the time passed since the previous events. In this setting, it is reasonable to think of a parent-child relation between two events in the event sequence as a result of some type of real-world relation between the individuals associated with those events. In this regard, a cluster may be defined as a group of individuals whose events form a tree of parent-child relations. If a cluster is known to an adversary, then the presence of a cluster member's data in the sequence may be revealed by the presence of not only the event directly associated with them, but also the events associated with other individuals in the same cluster.

Definition 3: Consider sequences of events in form of $S(t)=\{e_i=(x_i, t_i)|t_i<t\}$. Two sequences of events $S(t)$ and $S_{-j}(t)$ drawn from an unknown point process observed up until some time $t>0$ are "neighboring" if they differ only in the presence of the events that belong to the same cluster as event j.

Two scenarios may be considered. In the first scenario, it is assumed that 1) the adversary has knowledge of the relations among the individuals whose events are present in the data; and 2) the learner is aware of the relations or at least the maximum size of clusters of connected individuals, noting that this is equivalent to the maximum tree size in the sequence. In this scenario, it may be said that the learner is relation-aware. By contrast, in the second scenario, the learner is relation-unaware, in that it does not have full knowledge of the relations and therefore does not know the maximum size of the clusters. However, in the second scenario, it is assumed that the adversary may have greater knowledge of the relations compared to the learner, either now or at some point in time in the future. Providing privacy guarantees in the second scenario requires obtaining probabilistic upper bounds by viewing Hawkes processes as branching processes, which results in the immigration-birth representation of Hawkes processes. This result may be expressed as shown below in Lemma 1:

Lemma 1: Consider a Hawkes process H(t) defined in accordance with Equation 1 above and observed until time T.

For any $$0 < \gamma \leq 1 \text{ and } T \geq \left(\frac{\mu \cdot x^2}{\gamma}\right)^{3/2},$$

with probability at least $1-\gamma$, all existing trees contain at most $$\frac{3 \log T}{(1-\alpha)^2}$$

individuals.

To account for the fact that the upper bound on the tree sizes in the sequence is probabilistic over the realizations of the Hawkes processes, random differential privacy (i.e., random DP) is adopted as the notion of privacy, also noting that the standard DP definition can be recovered from the definition of random DP when $\gamma=0$, accounting for the first scenario with relation-aware learner. The definition of random DP may be formalized for sequential events data generated from a point process as follows:

Definition 4: Let $S_P^T$ be the set of all possible realizations of a temporal point process P(t) until time T. A randomized mechanism $\mathfrak{M}: S_P^T \to y$ is $(\varepsilon, \gamma)$-differentially private if $$\mathbb{P}_{(\forall \mathcal{C} \subset y,} \mathbb{P}_{(\mathfrak{M}(S(T)) \in \mathcal{C})} \leq e^\varepsilon \mathbb{P}_{(\mathfrak{M}(S_{-i}(T)) \in \mathcal{C}))} \geq 1-\gamma$$

where the inner probability is over the randomness of the mechanism, and the outer probability is over neighboring streams $S(T)$, $S_{-i}(T) \in S_P^T$ drawn from point process P(t) until time T.

Private Estimation parameters of Hawkes process: In an exemplary embodiment, the DP estimator is based on the Laplace mechanism, i.e., sampling from a Laplace distribution centered at the output of the non-private estimates. To calculate the variance of the Laplace distribution, one needs to calculate the sensitivity of the estimates $\hat{\mu}$ and $\hat{\alpha}$ with respect to the change in any two neighboring data streams generated by a Hawkes process with parameters $\mu$ and $\alpha$.

As described above, the Hawkes parameters estimates $\hat{\mu}$ and $\hat{\alpha}$ can be uniquely calculated from the sample mean $\hat{\eta}$ and sample variance $\hat{\sigma}^2$ of $Y_i(\Delta)$. However, obtaining closed form expressions for $\hat{\mu}$ and $\hat{\alpha}$ in terms of $\hat{\eta}$ and $\hat{\sigma}^2$ is difficult, which makes it difficult to find the sensitivity of $\hat{\mu}$ and $\hat{\alpha}$ with respect to the input sequence. Due to post processing immunity of differential privacy and consequently random DP, if privacy guarantees are provided for $\hat{\mu}$ and $\hat{\alpha}$, the same guarantees hold for $\hat{\eta}$ and $\hat{\sigma}^2$. Hence, there is a focus on obtaining privacy guarantees for $\hat{\eta}$ and $\hat{\sigma}^2$.

Sensitivity: The sensitivity of estimates $\hat{\eta}$ and $\hat{\sigma}^2$ with respect to the change in the input sequence depends on $\mu$ and $\alpha$. Although there is no access to $\mu$ and $\alpha$, it is assumed that lower and upper bounds on their values are known, as indicated by Equation 9:

$$0 < \mu_{lower} \le \mu \le \mu_{upper}, \ 0 < \alpha_{lower} \le \alpha \le \alpha_{upper} < 1. \tag{9}$$

Lemma 2: Consider the count series $\{Y_i(\Delta)\}_{i=1}^K$ associated with a Hawkes process H defined in accordance with the intensity function as expressed in Equation 1. Suppose that the maximum number of correlated events in the Hawkes process is B. Then, the maximal amount of change in the sample mean $\hat{\eta}$ of the counts is at most B/K. Moreover, with probability at least 1−65, the maximal amount of change in the sample variance is upper bounded by $$\frac{B^2}{K} + \frac{2B^{3/2}\sqrt{\Delta}\, C_1}{(K-1)} \text{ where } C_1 = \sqrt{\frac{1.1 \cdot \mu_{upper}}{(1-\alpha_{upper})^3} \cdot \frac{1}{2}}.$$

As described above, the maximal number of events that distinguish two neighboring sequences corresponds to the number of individuals in the largest tree in branching process representation. In the scenario with a relation-unaware learner where B is not known, recall that Lemma 1 provides a probabilistic upper bound on the size of the largest tree.

Corollary 1: As a consequence of Lemma 1 and Lemma 2, for $0<\gamma\le 1/2$ and T such that $T \ge (\mu \cdot e^2/\gamma)^{5/2}$, in the scenario with relation-unaware learner, sensitivity of the sample mean and variance are $$\frac{C_2 \log T}{K} \text{ and } \frac{(C_2 \log T)^2}{K} + \frac{2(C_2 \log T)^{3/2}\sqrt{\Delta}\, C_1}{(K-1)},$$

respectively with probability at least 1−2γ, where $$C_2 = \frac{3}{(1-\alpha_{upper})^2}.$$

DP sample mean and sample variance: For a given $\varepsilon>0$, the following differential privacy versions of the sample mean and the sample variance are given by Equations 10 and 11 for the sequence observed until time $T=K\Delta$:

$$\hat{\eta}_{private} = \hat{\eta} + \Lambda\left(\frac{C_2 \log T}{K \cdot \epsilon}\right) \tag{10}$$

$$\hat{\sigma}^2_{private} = \hat{\sigma}^2 + \Lambda\left(\frac{C_2^2(\log T)^2 + 2C_2^{3/2} C_1 \cdot \frac{K}{K-1}(\log T)^{3/2}\sqrt{\Delta}}{K \cdot \epsilon}\right) \tag{11}$$

Lemma 3: The noisy mean estimator $\hat{\eta}_{private}$ is (2γ, ε)-random-DP, and the noisy variance estimator $\hat{\sigma}^2_{private}$ is also (2γ, ε)-random-DP.

DP estimation of the Hawkes parameters: As described above, $\hat{\eta}$ and $\hat{\sigma}^2$ uniquely define $\hat{\mu}$ and $\hat{\alpha}$ based on Equations 3 and 4.

Theorem 2: Let $\hat{\mu}_{private}$ and $\hat{\alpha}_{private}$ estimates be the estimators for $\mu$ and $\alpha$ by solving the system of Equations 3 and 4 with private estimates $\hat{\eta}_{private}$ and $\hat{\sigma}_{private}^2$. Then this estimation mechanism is (2γ, 2ε)-random-DP.

Theorem 2 is a consequence of the standard composition theorem and the post-processing immunity of differential privacy.

In the scenario with relation aware learner where B is known, the term $C_2 \log T$ in Equations 10 and 11 is replaced by the known value B. Also, the random privacy guarantees Lemma 3 and Theorem 2 improve to (γ, ε) and (γ, 2ε), respectively.

Sample complexity of the private estimator: To provide a concrete privacy utility trade-off analysis of the DP estimation procedure, sample complexity upper bounds for the private estimator described by Equations 10 and 11 are obtained. By comparing these results with those of the non-private estimator as expressed in Theorem 1, one can quantify the cost of making the estimator differentially private in terms of the additional observation time required by the private estimator to reach within a desired distance of the true Hawkes parameters.

Theorem 3: Consider the same setup and conditions as in Theorem 1, except with private estimates $\hat{\mu}_{private}$ and $\hat{\alpha}_{private}$ as described in Equations 10 and 11. In addition, let $$C_1 = \sqrt{\frac{1.1 \cdot \mu_{upper}}{(1-\alpha_{upper})^3} \cdot \frac{1}{2}} \text{ and } C_2 = \frac{3}{(1-\alpha_{upper})^2}.$$

For the choice of $\Delta = c \log T$ for some constant c, if Equations 12, 13, and 14 below are true:

$$T \ge \frac{C_9^2 \mu_{upper}}{(1-\alpha_{upper})^3 \xi^2} \max\left\{\Psi\left(1-\frac{\delta}{16}\right)^2, 9C_9^2\Psi\left(1-\frac{\delta}{32}\right)^2(\eta_4 - \sigma^2)\right\} \text{ and} \tag{12}$$

$$\frac{T}{\log T} \ge \frac{c\mu_{upper}}{(1-\alpha_{upper})^3 \xi}\max\left\{3C_9\Psi\left(1-\frac{\delta}{32}\right)^2, \frac{48C_9}{\delta}\right\} \text{ and} \tag{13}$$

$$\frac{T}{(\log T)^{3/2}} > \frac{4\sqrt{c}\, C_1 C_2^2 C_3}{\epsilon \xi}\log\left(\frac{4}{\delta}\right) \tag{14}$$

for some $0<\delta\le 1$, then $\mathbb{P}(|\hat{\mu}_{private}-\mu|>\xi)\le \delta$ and $\mathbb{P}(|\hat{\alpha}_{private}-\alpha|>\xi)\le \delta$ for (γ, 2ε)-random DP estimates $\hat{\mu}_{private}$ and $\hat{\alpha}_{private}$.

Proof sketch: Theorem 1 gives a lower bound on T, which yields $\mu\hat{}$ and $\alpha\hat{}$ being within a desired distance of $\mu$ and $\alpha$ respectively. It is desired that Theorem 1 should hold with $\xi/2$ and $\delta/2$, and so the condition on T is modified to reflect this budget. The remaining $\xi/2$, $\delta/2$ budget is used to bound distance between sample estimates and their private counterparts, and relies on the tail bound of the Laplace random variable. It may be shown that Equations 12 and 13 are sufficient for the non-private estimates to be within $\xi/2$ distance of the true values with $\Delta = c \log T$ with probability at least $1-\delta/2$. It may then be shown that Equation 14, which is required to bound the tail of the Laplace distribution as expressed in Equations 10 and 11, guarantees that the private estimates are within $\xi/2$ distance of the non-private estimates with probability at least $1-\delta/2$. Note that for the relations-aware scenario with the maximum number of correlated events B, Equation 14 becomes $$\frac{T}{\sqrt{\log T}} > \frac{4\sqrt{c}\, B^2 C_1 C_9}{\epsilon \xi} \log\left(\frac{4}{\delta}\right).$$

Cost of privacy: For the inverse CDF function $\Psi(\cdot)$, the following expression is true:

$$\lim_{x \to 0} \Psi(1 - x) = \sqrt{2 \log \frac{1}{x}}.$$

Therefore, for arbitrarily small $\delta$ and large enough T, the condition on T in Theorem 1 becomes $$T = O\left(\frac{1}{\delta \xi}\right).$$

By contrast, for small enough $\delta$ and large enough T, for the private estimator in the relation-unaware scenario, the requirement on T is $$\frac{T}{\log T} = O\left(\frac{1}{\xi \delta}\right)$$

which, ignoring log-log terms, can be written as $$T = O\left(\frac{\log(1/\delta \xi)}{\delta \xi}\right).$$

Equivalently, one can state these results in terms of how fast the estimates converge to the true values ($\mu$, $\alpha$). While the non-private estimates ($\hat{\mu}$, $\hat{\alpha}$) have a convergence rate of $$O\left(\frac{1}{T}\right),$$

the rate of convergence for the private estimates ($\hat{\mu}_{private}$, $\hat{\alpha}_{private}$) is $$O\left(\frac{\log T}{T}\right).$$

This means that the DP guarantee of the private estimator comes at the cost of an extra log T term, as well as larger constants, i.e., 48 instead of 24 in the dominant term, in the convergence rate. Further, in the relation-aware scenario, the convergence rate $$O\left(\frac{1}{T}\right)$$

of the non-private estimator is preserved, albeit with larger constants, i.e., 48 instead of 24.

Accordingly, with this technology, a process for differentially private learning of Hawkes processes in order to preserve privacy of individuals whose activity is linked to the time-sequential data is provided.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims, and their equivalents, and shall not be restricted or limited by the foregoing detailed description.

What is claimed is:

1. A method for preserving privacy with respect to modeling a sequence of events, the method being implemented by at least one processor, the method comprising:
receiving, by the at least one processor, first information that relates to a sequence of events;
modeling, by the at least one processor based on the received first information, the sequence of events by a Hawkes process that has an intensity that is characterized by an exogenous base intensity rate and an indigenous component that relates to an impact of previous events, the indigenous component being characterized by an excitation rate and a decay rate;
analyzing, by the at least one processor, the received first information; and
determining, by the at least one processor based on a result of the analyzing, an estimated value of the exogenous base intensity rate and an estimated value of the excitation rate,
wherein the determining comprises calculating, for a predetermined distance between true values of the exogenous base intensity rate and the excitation rate and the estimated values of the exogenous base intensity rate and the excitation rate, a first minimum amount of time over which the sequence of events is observable.

2. The method of claim 1, wherein the sequence of events includes an asynchronous sequence of events for which respective intervals of time between corresponding pairs of consecutive events are irregular.

3. The method of claim 1, wherein the first information that relates to the sequence of events includes, for each respective event included in the sequence of events, second information that indicates a respective time of occurrence of the respective event and third information that indicates an identity of an individual person associated with the respective event.

4. The method of claim 3, wherein the analyzing comprises:
deriving a discrete time count data time series associated with the sequence of events by generating a count measure on consecutive time intervals having a predetermined length;
estimating a sample mean value that corresponds to the discrete count data time series; and
estimating a sample variance value that corresponds to the discrete count data time series, and
wherein the determining of the estimated value of the exogenous base intensity rate and the estimated value of the excitation rate is based on the estimated sample mean value and the estimated sample variance value.

5. The method of claim 4, wherein the modeling comprises introducing differential privacy to the sequence of events by adding noise to the estimated sample mean value and to the estimated sample variance value,
wherein the differential privacy corresponds to a probability that an observation of an output of the modeling is usable for inferring the third information that indicates an identity of an individual person for at least one event included in the sequence of events.

6. The method of claim 5, wherein the introducing of the differential privacy comprises using a Laplace mechanism that is defined by a difference between the sample mean value and the sample variance value obtained from a first data set that corresponds to the sequence of events and the sample mean value and the sample variance value obtained from a second data set that corresponds to an adjacent sequence of events.

7. The method of claim 5, further comprising calculating a cost associated with the introducing of the differential privacy, wherein the cost is expressible as a required additional amount of time over which the sequence of events is observable for the predetermined distance between true values of the exogenous base intensity rate and the excitation rate and the estimated values of the exogenous base intensity rate and the excitation rate.

8. The method of claim 7, wherein the calculating of the cost comprises:
assigning a lower bound and an upper bound to the value of the exogenous base intensity rate and assigning a lower bound and an upper bound to the value of the excitation rate; and calculating a sensitivity of the sample mean value and the sample variance value based on the assigned upper bounds and lower bounds.

9. A computing apparatus for preserving privacy with respect to modeling a sequence of events, the computing apparatus comprising:
a processor;
a memory; and
a communication interface coupled to each of the processor and the memory,
wherein the processor is configured to:
receive, via the communication interface, first information that relates to a sequence of events;
model, based on the received first information, the sequence of events by a Hawkes process that has an intensity that is characterized by an exogenous base intensity rate and an indigenous component that relates to an impact of previous events, the indigenous component being characterized by an excitation rate and a decay rate;
analyze the received first information; and
determine, based on a result of the analysis, an estimated value of the exogenous base intensity rate and an estimated value of the excitation rate,
wherein the processor is further configured to calculate, for a predetermined distance between true values of the exogenous base intensity rate and the excitation rate and the estimated values of the exogenous base intensity rate and the excitation rate, a first minimum amount of time over which the sequence of events is observable.

10. The computing apparatus of claim 9, wherein the sequence of events includes an asynchronous sequence of events for which respective intervals of time between corresponding pairs of consecutive events are irregular.

11. The computing apparatus of claim 9, wherein the first information that relates to the sequence of events includes, for each respective event included in the sequence of events, second information that indicates a respective time of occurrence of the respective event and third information that indicates an identity of an individual person associated with the respective event.

12. The computing apparatus of claim 11, wherein the processor is further configured to:
derive a discrete time count data time series associated with the sequence of events by generating a count measure on consecutive time intervals having a predetermined length;
estimate a sample mean value that corresponds to the discrete count data time series;
estimate a sample variance value that corresponds to the discrete count data time series; and
determine the estimated value of the exogenous base intensity rate and the estimated value of the excitation rate based on the estimated sample mean value and the estimated sample variance value.

13. The computing apparatus of claim 12, wherein the processor is further configured to introduce differential privacy to the sequence of events by adding noise to the estimated sample mean value and to the estimated sample variance value, and
wherein the differential privacy corresponds to a probability that an observation of an output of the modeling is usable for inferring the third information that indicates an identity of an individual person for at least one event included in the sequence of events.

14. The computing apparatus of claim 13, wherein the processor is further configured to introduce the differential privacy to the sequence of events by using a Laplace mechanism that is defined by a difference between the sample mean value and the sample variance value obtained from a first data set that corresponds to the sequence of events and the sample mean value and the sample variance value obtained from a second data set that corresponds to an adjacent sequence of events.

15. The computing apparatus of claim 13, wherein the processor is further configured to calculate a cost associated with the introduction of the differential privacy, wherein the cost is expressible as a required additional amount of time over which the sequence of events is observable for the predetermined distance between true values of the exogenous base intensity rate and the excitation rate and the estimated values of the exogenous base intensity rate and the excitation rate.

16. The computing apparatus of claim 15, wherein the processor is further configured to:
assign a lower bound and an upper bound to the value of the exogenous base intensity rate and assign a lower bound and an upper bound to the value of the excitation rate; and
calculate a sensitivity of the sample mean value and the sample variance value based on the assigned upper bounds and lower bounds.

17. A non-transitory computer readable storage medium storing instructions for preserving privacy with respect to modeling a sequence of events, the storage medium comprising executable code which, when executed by a processor, causes the processor to:
receive first information that relates to a sequence of events;
model, based on the received first information, the sequence of events by a Hawkes process that has an intensity that is characterized by an exogenous base intensity rate and an indigenous component that relates to an impact of previous events, the indigenous component being characterized by an excitation rate and a decay rate;
analyze the received first information; and
determine, based on a result of the analysis, an estimated value of the exogenous base intensity rate and an estimated value of the excitation rate,
wherein when executed by the processor, the executable code further causes the processor to calculate, for a predetermined distance between true values of the exogenous base intensity rate and the excitation rate and the estimated values of the exogenous base intensity rate and the excitation rate, a first minimum amount of time over which the sequence of events is observable.

18. The storage medium of claim 17, wherein the sequence of events includes an asynchronous sequence of events for which respective intervals of time between corresponding pairs of consecutive events are irregular.

* * * * *